United States Patent [19]

Nagai et al.

[11] Patent Number: 5,448,924
[45] Date of Patent: Sep. 12, 1995

[54] SYSTEM FOR MONITORING BEHAVIOR OF ROTARY BODY

[75] Inventors: Yataro Nagai; Yuji Yamauchi, both of Tokyo, Japan

[73] Assignee: Tanken Seiko Kabushiki Kaisha, Tokyo, Japan

[21] Appl. No.: 35,730

[22] Filed: Mar. 23, 1993

[30] Foreign Application Priority Data

Apr. 15, 1992 [JP] Japan ................... 4-121410

[51] Int. Cl.$^6$ .................. G01B 7/14; G01B 7/30; G01M 19/00
[52] U.S. Cl. ...................... 73/865.9; 277/2; 277/901; 324/207.23
[58] Field of Search .............. 73/865.9; 277/2, 30, 277/935 D, 901, DIG. 8; 324/207.22, 207.23

[56] References Cited

U.S. PATENT DOCUMENTS

| | | | |
|---|---|---|---|
| 3,167,964 | 2/1965 | Dega et al. | 73/865.9 |
| 3,201,996 | 8/1965 | Silvia | 73/865.9 |
| 4,000,656 | 1/1977 | Moioli | 73/865.9 |
| 4,133,201 | 1/1979 | Klinger | 73/865.9 |
| 4,372,625 | 2/1983 | Petros | 73/865.9 |
| 4,692,699 | 9/1987 | Brunet et al. | 324/207 |
| 5,036,236 | 7/1991 | Wilson | 324/207.19 |
| 5,092,612 | 3/1992 | Victor et al. | 277/96.1 |
| 5,198,763 | 3/1993 | Konishi | 324/207.23 |
| 5,337,462 | 8/1994 | Hedman | 73/865.9 |
| 5,345,829 | 9/1994 | Yamauchi et al. | 73/865.9 |

Primary Examiner—Richard E. Chilcot, Jr.
Assistant Examiner—George M. Dombroske
Attorney, Agent, or Firm—Nields & Lemack

[57] ABSTRACT

A behavior monitoring system for a rotary body is capable of monitoring displacement of the rotary body in a plurality of directions. The behavior monitoring system comprises an inclined surface formed on the rotary body and extending in oblique to a rotational axis, and a sensor means for detecting displacement of said inclined surface.

29 Claims, 5 Drawing Sheets

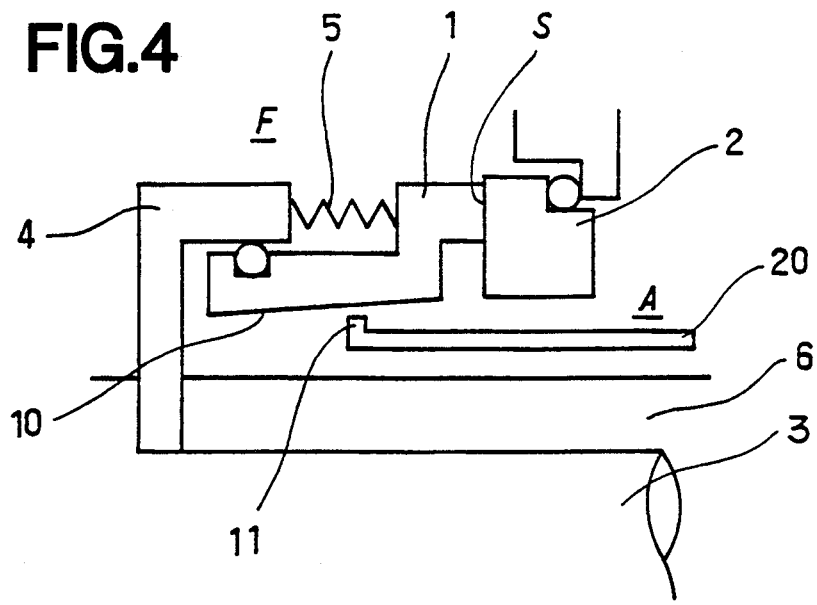
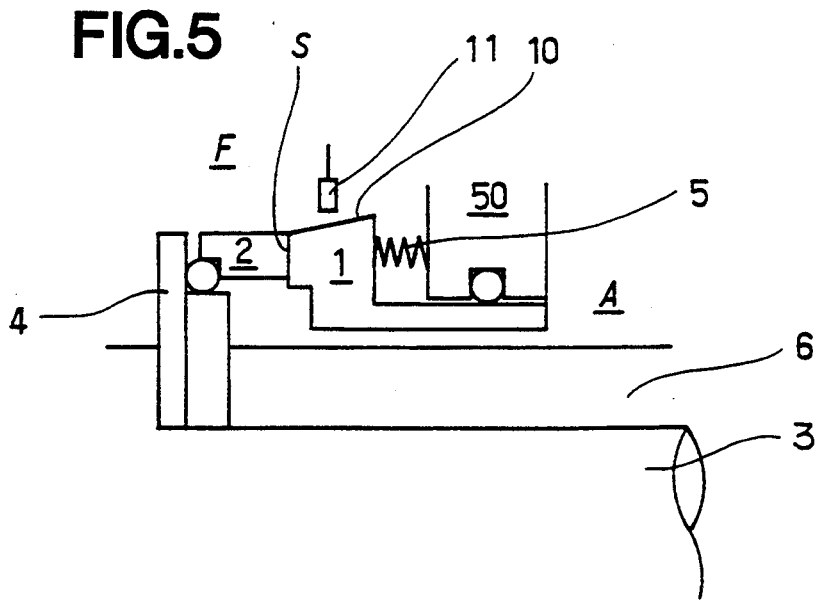

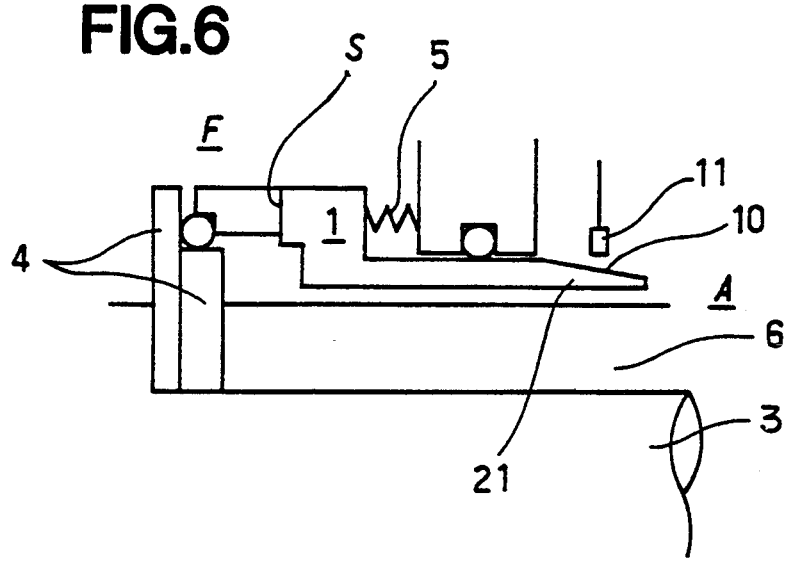
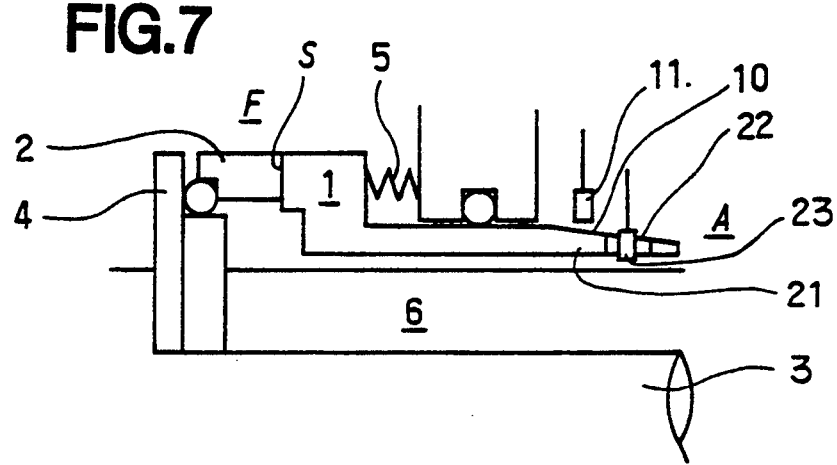
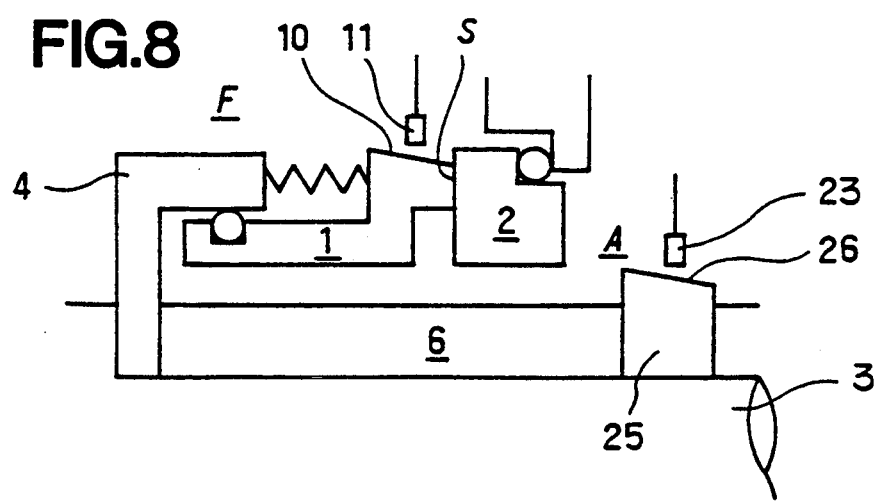

SYSTEM FOR MONITORING BEHAVIOR OF ROTARY BODY

BACKGROUND OF THE INVENTION

1. Field of the Invention

The present invention relates to a behavior monitoring system for a rotary body.

2. Description of the Related Art

In a mechanical seal for sealing a rotary shaft or so forth, it is quite important for monitoring behavior of a seal ring of a rotary shaft or a mechanical seal. In the mechanical seal, it is possible to predict occurrence of a leakage in the mechanical seal in advance by monitoring radial and/or axial displacement of the seal ring forming a sealing surface. A device for predicting such failure has already been proposed.

However, since the conventional device monitors behavior of the rotary body, such as the seal ring of the mechanical seal, both in the radial and axial directions, at least two displacement sensors have to be provided to cause high cost. Furthermore, mounting of two sensors requires careful consideration for determining the mounting positions as well as labor intensive mounting operation. In particular, in case of the mechanical seal, the displacement sensors are frequency mounted in a severe environment, such as high temperature, high pressure or corrosive fluid or so forth. For withstanding under such severe environment, relatively expensive sensor has to be employed so that the increasing of number of sensors to be installed creates substantial cost problem.

SUMMARY OF THE INVENTION

In view of the drawback in the prior art, it is a general object of the present invention to provide a behavior monitoring system for a rotary body, which can solve the problems in the prior art.

Another and more specific object of the present invention is to provide a behavior monitoring system which can monitor displacement of the rotary body in a plurality of directions with reduced number of displacement sensors.

In order to accomplish the above-mentioned and other objects, according to one aspect of the invention, a behavior monitoring system for a rotary body comprises:

an inclined surface formed on the rotary body and extending in oblique to a rotational axis; and a sensor means for detecting displacement of the inclined surface.

According to another aspect of the invention, a behavior monitoring system for a mechanical seal which forms a sealing surface with a rotary ring and a non-rotary ring, at least one of the rotary ring and the non-rotary ring being a slidable ring slidable in an axial direction, comprises:

an inclined surface formed on the slidable ring and extending in oblique to a rotational axis; and a sensor means for detecting displacement of the inclined surface.

According to a further aspect of the invention, a behavior monitoring system for a mechanical seal which forms a sealing surface with a rotary ring and a non-rotary ring, at least one of the rotary ring and the non-rotary ring being a slidable ring slidable in an axial direction, comprises:

a first inclined surface formed on the slidable ring and extending in oblique to a rotational axis;

a first sensor means for detecting displacement of the first inclined surface;

a second inclined surface formed on the rotary shaft and extending in oblique to a rotational axis; and a second sensor means for detecting displacement of the second inclined surface.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 4 is a fragmentary section showing another embodiment of the rotary body behavior monitoring system of the invention;

FIG. 5 is a fragmentary section showing a further embodiment of the rotary body behavior monitoring system of the invention;

FIG. 6 is a fragmentary section showing a still further embodiment of the rotary body behavior monitoring system of the invention;

FIG. 7 is a fragmentary section showing a yet further embodiment of the rotary body behavior monitoring system of the invention; and FIG. 8 is a fragmentary section showing a still further embodiment of the rotary body behavior monitoring system of the invention.

DESCRIPTION OF THE PREFERRED EMBODIMENT

The preferred embodiments of a behavior monitoring system for a rotary body according to the present invention will be discussed in detail with reference to the drawings.

Figure 1:
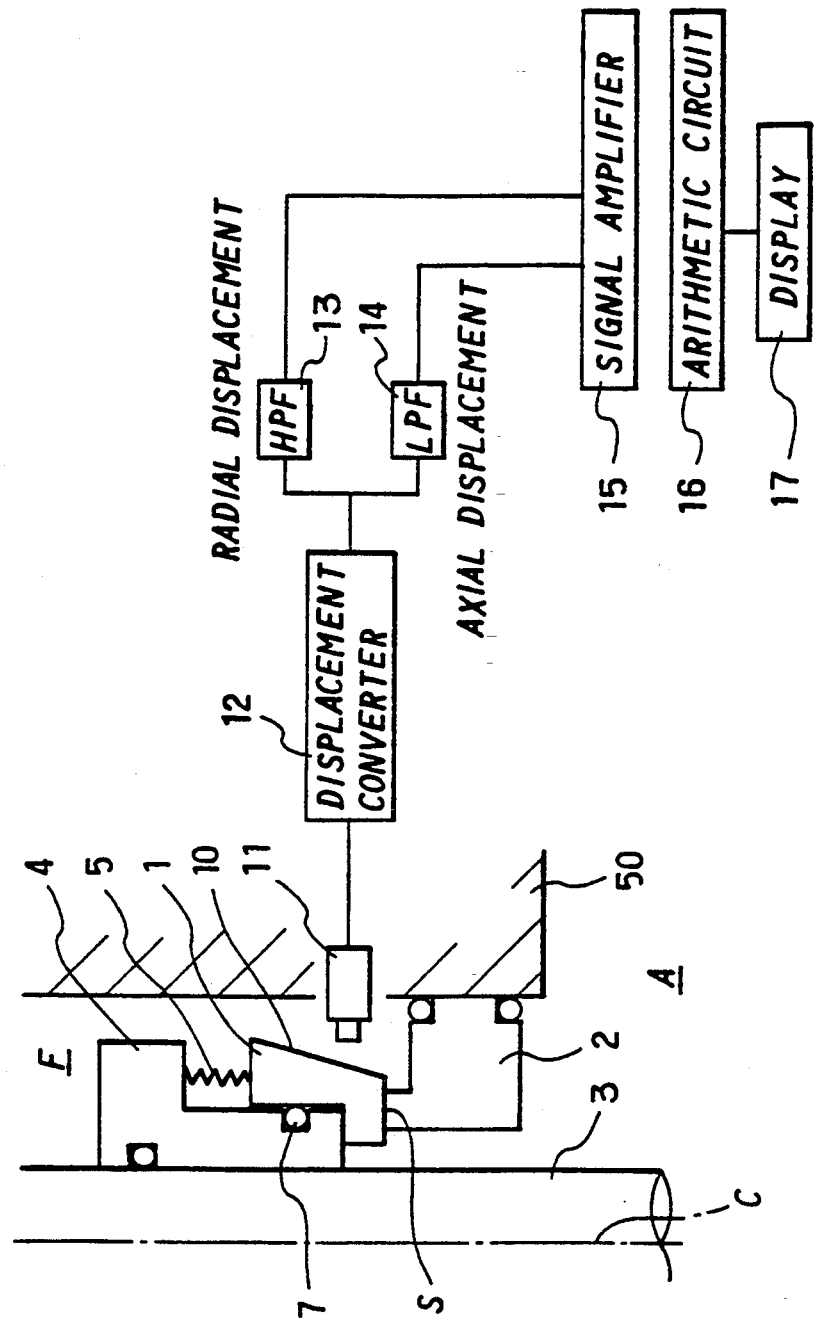
FIG. 1 is a schematic block diagram of the preferred embodiment of a rotary body behavior monitoring system according to the invention.

FIG. 1 is a partial section showing the preferred embodiment of the behavior monitoring system of the invention as applied for a mechanical seal.

The mechanical seal includes a slidable ring 1 which is mounted on a rotary shaft 3 via a support ring 4 for rotation with the rotary shaft 3 and slidable in an axial direction C, and a stationary ring 2 mounted on a casing 50 in non-rotating and non-slidable fashion. The slidable ring 1 and the stationary ring 2 are slidably contacted to each other at the end faces for forming a sealing surface S for sealing the interior side F. The reference numeral 5 denotes a spring for biasing the slidable ring 1 toward the stationary ring 2, and the reference numeral 7 denotes an O ring.

The slidable ring 1 is formed into a annular truncated conical configuration with defining a inclined surface 10 inclining in the axial direction C on the outer periphery. In opposition to the inclined surface 10, a displacement sensor 11 is provided for measuring displacement of the inclined surface 10.

As the displacement sensor 11, various types of displacement sensors, such as an eddy-current type displacement sensor, an optical displacement sensor, an electrostatic displacement sensor or so forth can be employed. In short, any displacement sensors which can detect displacement of the inclined surface 10 may be employed for implementing the shown embodiment of the rotary body behavior monitoring system.

Figure 2A:
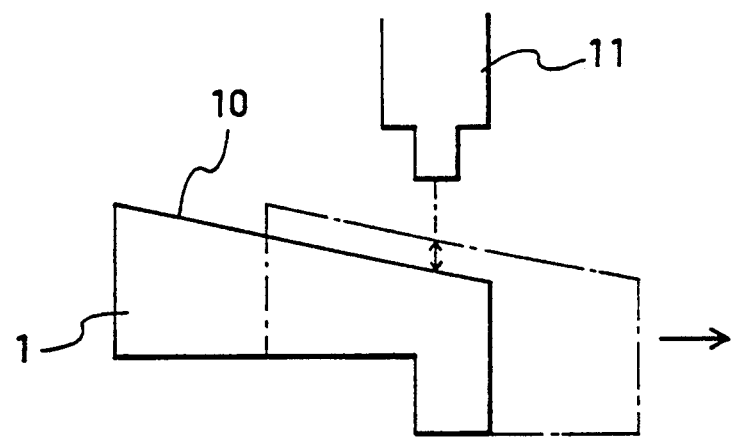
FIGS. 2(A) and 2(8) are illustrations showing displacement of a slidable ring.
Figure 2B:
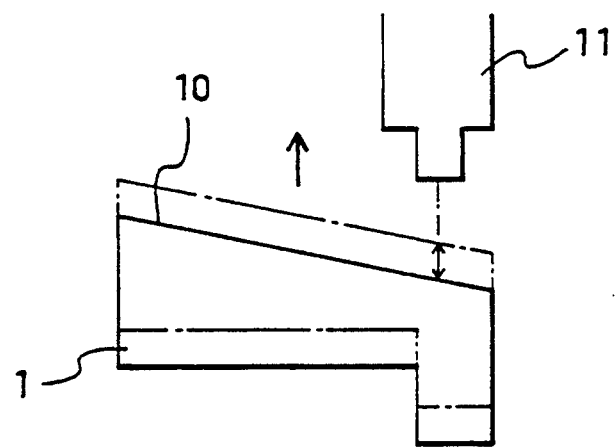

The inclined surface 10 displaces in the radial direction either in the axial displacement of the slidable ring 1 as shown in FIG. 2(A) or in the radial displacement of the slidable ring 1 as shown in FIG. 2(8). Normally, the displacement of the slidable ring 1 is a composite displacement including the axial component and the radial component. Therefore, a displacement signal output from the displacement sensor 11 and representative of the displacement of the inclined surface 10 becomes a composite signal, in which a radial displacement signal component and an axial signal components are superimposed to each other.

However, in case of the mechanical seal, the radial displacement is a cyclic displacement with a substantially short period associated with rotation of the rotary shaft 3. On the other hand, the axial displacement is a cyclic displacement with a substantially long period due to wearing of sealing surfaces S of the slidable ring 1 and the stationary ring 2, thermal expansion of the rotary shaft 3 in the axial direction or variation of pressure of the sealed fluid. Therefore, by employing a filter adapted to a spectrum characteristics of the displacement, the radial displacement signal component and the axial displacement signal component can be separated from the displacement signal output from the displacement sensor 11.

Therefore, as shown in FIG. 1, the displacement signal from the displacement sensor 11 is initially processed by a displacement converter 12 which performs a predetermined known signal conversion. Then, employing a high-pass filter (HPF) 13 and a low-pass filter (LPF) 14, the radial displacement signal component and the axial displacement signal component are separated. Namely, the high-pass filter 13 passes only the radial displacement signal component which has substantially short period. On the other hand, the low-pass filter 14 passes only the axial displacement 1 component which has substantially long period. The outputs of both filters 13 and 14 amplified by a signal amplifier 15 and then processes by an arithmetic circuit 16 for deriving values representative of the radial and axial displacement magnitude. The values thus derived by the arithmetic circuit 16 is displayed on a display 17.

Figure 3A:
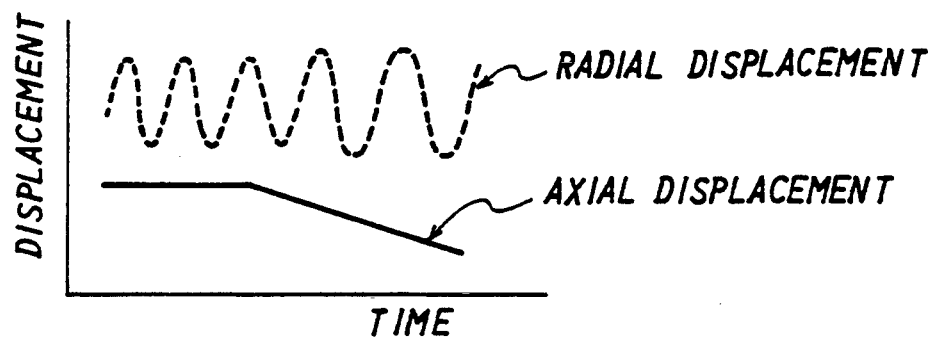
FIGS. 3(A) and 3(B) are charts showing operation of the preferred embodiment of the rotary body behavior monitoring system of the invention.

FIG. 3(A) shows one example of the displacement signals appearing on the display 17. The broken line represents the radial displacement having substantially short period, and the solid line represents the axial displacement having substantially long period. In the shown example, it is illustrated the wearing of the sealing surface S through an elapsed time. As can be observed in the shown example, although no substantial variation is perceptive in the displacement in the radial direction, axial displacement of the slidable ring 1 toward the stationary ring 2 can be appreciated. It should be noted that though the variation of the axial displacement is illustrated as descending curve in the shown example, it can become ascending curve depending upon the direction of inclination of the inclined surface 10 and the characteristics of the displacement sensor 11.

Figure 3B:
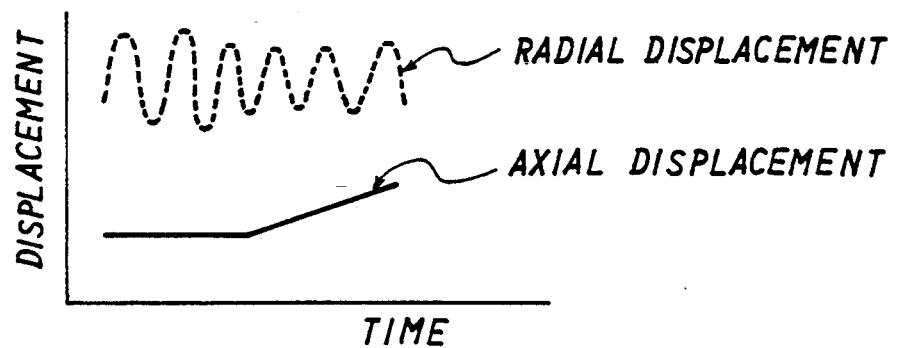

FIG. 3(B) shows another example, in which the sealing surfaces S are forced away from each other to open. Typically, the opening of the sealing surfaces S is caused by accumulation of the foreign matter in the slidable ring 1 or grasping of packing to stick the slidable ring 1 for preventing it from floating. Therefore, the radial displacement gradually becomes synchronous with the axial displacement through elapsing of time. On the other hand, the slidable ring 1 axially displaces away from the stationary ring 2.

As can be appreciated herefrom, by detecting displacement of the inclined surface 10, the behavior of the mechanical seal can be successfully monitored.

It should be noted that, although the embodiment illustrated in FIG. 1 provides the inclined surface 10 on the outer periphery of the slidable ring 1, the present invention should not be specified to the shown construction. For instance, it is possible to provide the inclined surface 10 on the inner periphery of the slidable ring 1. FIG. 4 shows another embodiment of the rotary body behavior monitoring system according to the invention. In the shown embodiment, a wider clearance is provided between the outer periphery of a sleeve 6 of the rotary shaft 3 and the inner periphery of the slidable ring 1. Within this clearance, the displacement sensor 11 is disposed by means of a supporting member 20 for detecting the displacement of the inclined surface 10 which is formed on the inner periphery of the slidable ring 1. In this case, since the displacement sensor 11 is not disposed in the interior side F but placed in the atmosphere side so that the sensor may not be exposed to the sealed fluid. Therefore, employment for special sensor for withstanding high pressure or high temperature, or resisting against corrosion, becomes unnecessary.

FIG. 5 shows a further embodiment of the rotary body behavior monitoring system according to the invention applied to a so-called static type mechanical seal, in which the slidable ring 1 is mounted on the casing 50 and thus not rotatable with the rotary shaft 3. As can be appreciated herefrom, the present invention is applicable for any types of mechanical seals.

FIG. 6 shows a still further embodiment of the rotary body behavior monitoring system according to the invention, which is also applied to the static type mechanical seal. In the shown embodiment, the slidable ring 1 of the mechanical seal is extended at the end 21 remote from the sealing surface S so that the extended end 21 is exposed to the atmosphere. The inclined surface 10 is formed on the extended end 21. Similarly to the foregoing embodiment of FIG. 4, since the displacement 11 may be placed at the atmosphere side, no special sensor is required.

FIG. 7 shows a yet further embodiment of the rotary body behavior monitoring system of the invention, which is provided with the extended end 21 as in the former embodiment of FIG. 6. In the shown embodiment, an elongated opening 22 is formed through the extended end 21. Though the elongated opening 22, a displacement sensor 23 is disposed in opposition to the rotary shaft 3 (or to the sleeve 6, in practice) for monitoring the displacement of the outer periphery of the rotary shaft 3. With the shown construction, in conjunction with monitoring of behavior of the mechanical seal by detecting the displacement of the inclined surface 10 by means of the displacement sensor 11, the behavior of the rotary shaft 3 can be monitored by means of the displacement sensor 23. This is particularly advantageous since discrimination of the behavior of the slidable ring 1 can be made with reference to the rotary shaft 3. In addition, in this case, since the displacement sensor 23 can be placed in the vicinity of the displacement sensor 11, a monitoring error can be minimized when the behavior of the mechanical seal is discriminated with reference to the behavior of the rotary shaft 3.

It should be noted that although the shown embodiment does not provide the inclined surface of the sleeve 6 (i.e. the rotary shaft 3) so that only radial displacement of the sleeve 6 (or the rotary shaft 3) is detected, it is, of course, possible to provide the inclined surface on the rotary shaft or the sleeve so that both of the radial and axial displacement can be detected.

FIG. 8 shows a yet further embodiment of the rotary body behavior monitoring system of the invention, in which in addition to the slidable ring 1, a truncated conical taper ring 25 is mounted on the rotary shaft 3. The taper ring 25 is provided with the inclined surface 26, to which the displacement sensor 23 is placed in opposition for monitoring displacement. With the shown construction, displacement of the slidable ring 1 can be monitored with reference to the displacement of the rotary shaft 3 with reduced number of sensors.

As set forth above, since the present invention permits monitoring of radial and axial displacement with the single displacement sensor 14, necessary number of the sensor to be employed for implementing rotary body behavior monitoring can be successfully reduced. Also, in the embodiments of FIGS. 4, 6 and 7, since the displacement sensors are positioned at the atmosphere side (exterior side) A, the special sensor becomes unnecessary. In addition, in the embodiments of FIGS. 7 and 8, since the behavior of the rotary shaft 3 can be monitored in conjunction with monitoring of the behavior of the slidable ring 4, various analysis can be performed with high precision.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A behavior monitoring system for a rotary body, the system comprising:
   a rotatable body having an axis about which it can rotate with a frequency greater than that of any axial displacement thereof and having an annular truncated conical configuration defining an inclined surface;
   a sensor means for detecting radial displacement of said inclined surface from said sensor means; and
   means for deriving the actual axial and radial displacements from the detected radial displacement of said rotatable body by separating them based on their frequency.

2. A behavior monitoring system for a rotary body as set forth in claim 1, wherein said rotary body is a slidable ring of a mechanical seal, which slidable ring is movable in an axial direction.

3. A behavior monitoring system for a rotary body as set forth in claim 2, which further comprises a separation means for separating an output signal of said sensor means depending upon spectrum characteristics to output a radial displacement indicative signal and an axial displacement indicative signal.

4. A behavior monitoring system for a rotary body as set forth in claim 3, wherein said separation means is a filter.

5. A behavior monitoring system for a rotary body as set forth in claim 2, which further comprises a separation means for separating an output signal of said sensor means depending upon spectrum characteristics.

6. A behavior monitoring system for a rotary body as set forth in claim 5, wherein said separation means is a filter.

7. A behavior monitoring system for a rotary body as set forth in claim 1, wherein said rotary body is a rotary shaft.

8. A behavior monitoring system for a rotary body as set forth in claim 7, which further comprises a separation means for separating an output signal of said sensor means depending upon spectrum characteristics.

9. A behavior monitoring system for a rotary body as set forth in claim 7, which further comprises a separation means for separating an output signal of said sensor means depending upon spectrum characteristics to output a radial displacement indicative signal and an axial displacement indicative signal.

10. A behavior monitoring system for a rotary body as set forth in claim 1, wherein said rotary body is a slidable ring of a mechanical seal movable in an axial direction and a rotary shaft, on which said mechanical seal is installed, and said sensor means detects displacement of inclined surfaces provided on said slidable ring and said rotary shaft.

11. A behavior monitoring system for a rotary body as set forth in claim 10, which further comprises a separation means for separating an output signal of said sensor means depending upon spectrum characteristics.

12. A behavior monitoring system for a rotary body as set forth in claim 10, which further comprises a separation means for separating an output signal of said sensor means depending upon spectrum characteristics to output a radial displacement indicative signal and an axial displacement indicative signal.

13. A behavior monitoring system for a rotary body as set forth in claim 1, which further comprises a separation means for separating an output signal of said sensor means depending upon spectrum characteristics.

14. A behavior, monitoring system for a rotary body as set forth in claim 13, wherein said separation means is a filter.

15. A behavior monitoring system for a rotary body as set forth in claim 1, which further comprises a separation means for separating an output signal of said sensor means depending upon spectrum characteristics to output a radial displacement indicative signal and an axial displacement indicative signal.

16. A behavior monitoring system for a rotary body as set forth in claim 15, wherein said separation means is a filter.

17. A behavior monitoring system for a mechanical seal which forms a sealing surface with a rotary ring and a non-rotary ring, at least one of said rotary ring and said non-rotary ring being a slidable ring slidable in an axial direction, the system comprising:

a slidable ring having an axis with respect to which it is radially displaceable with a frequency greater than that of any axial displacement thereof and having an annular truncated conical configuration defining an inclined surface;

a sensor means for detecting radial displacement of said inclined surface from said sensor means; and means for deriving the actual axial and radial displacements from the detected radial displacement of said slidable ring by separating them based on their frequency.

18. A behavior monitoring system for a mechanical seal as set forth in claim 17, which further comprises a filter means for separating an output of said sensor means depending upon a spectrum characteristics for outputting a radial displacement indicative signal and an axial displacement indicative signal.

19. A behavior monitoring system for a mechanical seal as set forth in claim 17, wherein said inclined surface is formed on the outer periphery of said slidable ring.

20. A behavior monitoring system for a mechanical seal as set forth in claim 17, wherein said inclined surface is formed at a portion of said slidable ring exposed to the atmosphere.

21. A behavior monitoring system for a mechanical seal as set forth in claim 20, wherein said inclined surface is formed on the outer periphery of said slidable ring.

22. A behavior monitoring system for a mechanical seal as set forth in claim 20, wherein said inclined surface is formed on the inner periphery of said slidable ring.

23. A behavior monitoring system for a mechanical seal as set forth in claim 17, wherein said inclined surface is formed on the inner periphery of said slidable ring.

24. A behavior monitoring system for a mechanical seal as set forth in claim 17, wherein one end of said slidable ring is extended to the exterior side and said inclined surface is formed on said extended end.

25. A behavior monitoring system for a mechanical seal as set forth in claim 24, wherein a through opening is formed through said extended end and a rotary shaft sensor means is disposed through said through opening for detecting displacement of said rotary shaft, on which said mechanical seal is installed.

26. A behavior monitoring system for a mechanical seal as set forth in claim 25, an inclined surface is formed on the portion of said rotary shaft, for which the displacement is detected by said rotary shaft sensor means.

27. A behavior monitoring system for a mechanical seal which forms a sealing surface with a rotary ring and a non-rotary ring, at least one of said rotary ring and said non-rotary ring being a slidable ring slidable in an axial direction, the system comprising:

a slidable ring having an axis with respect to which it is radially displaceable with a frequency greater than that of any axial displacement thereof and having an annular truncated conical configuration defining a first inclined surface.;

a first sensor means for detecting radial displacement of said first inclined surface from said first sensor means; and means for deriving the actual axial and radial displacements of said slidable ring by separating them based on their frequency;

a rotary shaft having an axis about which it can rotate with a frequency greater than that of any axial displacement thereof and having an annular truncated conical configuration defining a second inclined surface;

a second sensor means for detecting radial displacement of said second inclined surface from said second sensor means; and means for deriving the actual axial and radial displacements from the detected radial displacement of said rotary shaft by separating them based on their frequency.

28. A behavior monitoring system for a mechanical seal as set forth in claim 27, which further comprises a filter means for separating each output of said first and second sensor means depending upon a spectrum characteristics for outputting a radial displacement indicative signal and an axial displacement indicative signal.

29. A behavior monitoring system for a mechanical seal as set forth in claim 27, wherein a taper ring is mounted on said rotary shaft for forming said inclined surface with the taper surface of said taper ring.

* * * * *